(12) United States Patent
Pattakos et al.

(10) Patent No.: US 8,166,948 B2
(45) Date of Patent: May 1, 2012

(54) THROTTLE-LESS ENGINE WITH IMPROVED VARIABLE VALVE SYSTEM

(76) Inventors: Manousos Pattakos, Nikea Piraeus (GR); John Pattakos, Nikea Piraeus (GR); Emmanouel Pattakos, Nikea Piraeus (GR)

( * ) Notice: Subject to any disclaimer, the term of this patent is extended or adjusted under 35 U.S.C. 154(b) by 807 days.

(21) Appl. No.: 12/298,135

(22) PCT Filed: Apr. 19, 2007

(86) PCT No.: PCT/IB2007/051412
§ 371 (c)(1), (2), (4) Date: Oct. 23, 2008

(87) PCT Pub. No.: WO2007/122563
PCT Pub. Date: Nov. 1, 2007

(65) Prior Publication Data
US 2009/0178633 A1      Jul. 16, 2009

(30) Foreign Application Priority Data
Apr. 25, 2006   (GR) ............................... 20060100245

(51) Int. Cl.
*F02N 3/00*          (2006.01)

(52) U.S. Cl. .................. 123/188.4; 123/188.2; 123/90.1; 123/90.11

(58) Field of Classification Search ................. 123/90.1, 123/90.11, 188.4, 188.2
See application file for complete search history.

(56) References Cited

FOREIGN PATENT DOCUMENTS

| | | | |
|---|---|---|---|
| DE | 19651148 A1 | * | 6/1998 |
| DE | 19855984 A1 | * | 6/2000 |
| DE | 19926506 A1 | * | 12/2000 |
| EP | 1361343 A1 | * | 11/2003 |
| FR | 456098 A1 | * | 6/1913 |
| FR | 1401216 A | * | 4/1965 |
| JP | 56066916 A | * | 6/1981 |
| JP | 57206723 A | * | 12/1982 |
| JP | 04203254 A | * | 7/1992 |
| WO | WO 9741346 A1 | * | 11/1997 |

* cited by examiner

*Primary Examiner* — Noah Kamen

(57) ABSTRACT

To improve the precision of the control of the charge of a cylinder during idling and low revs/light load operation, a bypass feeding path of low flow capacity provides the cylinder with air or mixture while the high flow capacity intake valves stay closed.

7 Claims, 6 Drawing Sheets

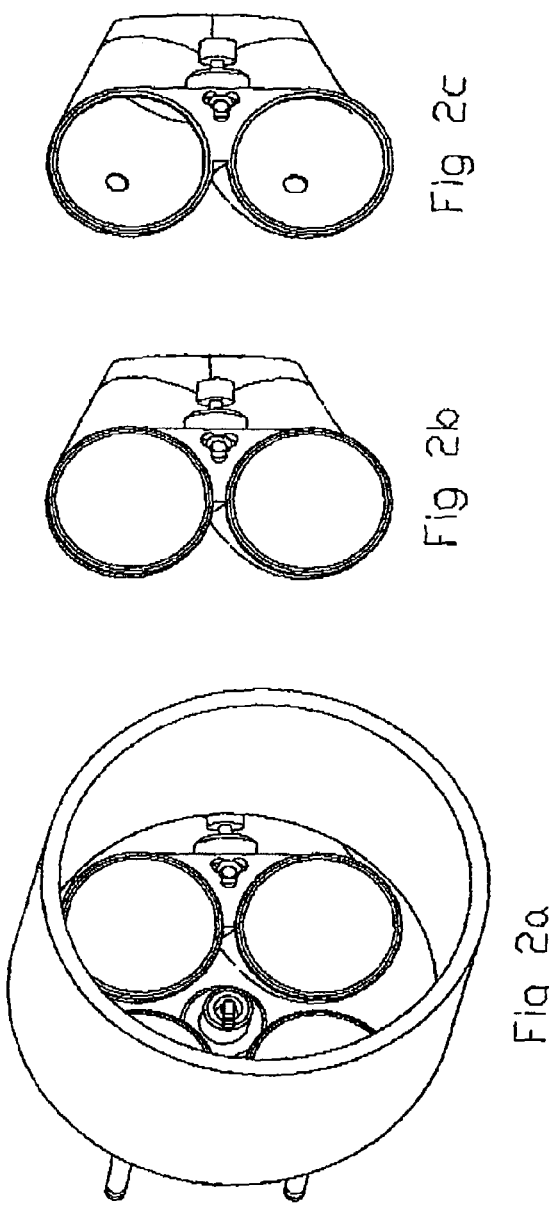
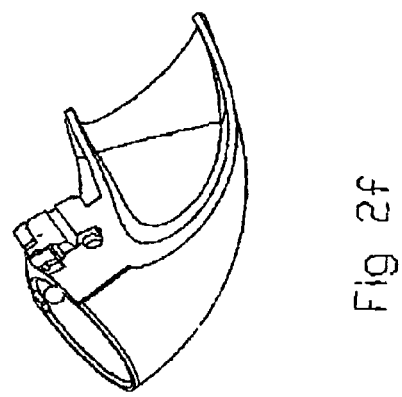
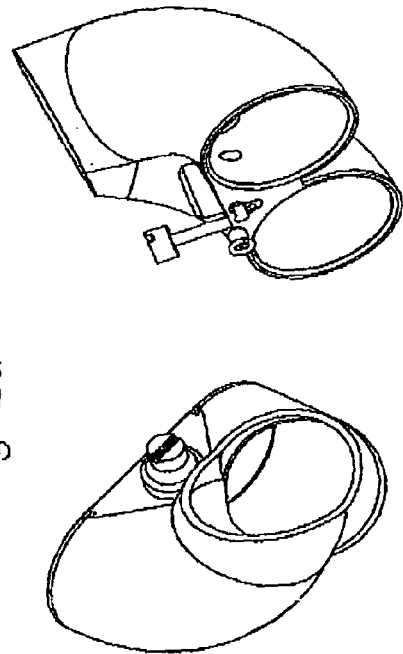

THROTTLE-LESS ENGINE WITH IMPROVED VARIABLE VALVE SYSTEM

FIELD OF THE INVENTION

The state of the art VVA engines, namely variable valve actuation engines, control the quantity of the charge by changing the valve lift: the lighter the load and the lower the revs of the engine, the smaller the necessary lift of the valves.

In the VVA engines, which have better efficiency at light loads than conventional engines, the necessary air flow for idling is around 1/150 of the air flow capacity at peak power, which means that extremely tiny lift for the intake valves is necessary to provide less charge at lower revs. In a typical VVA engine the ratio of valve lift to valve diameter, at max valve lift, is around 40%. This ratio becomes less than 0.5% for idling. For instance, an intake valve of 33 mm in diameter opens for 0.15 mm during idling. Such tiny valve lifts favor longevity of the valve train and benefit consumption but require extreme accuracy of manufacturing which, even if were possible during construction, is unlikely to be maintained during operation.

The thermal expansion, the flexing under stressing, the sticking of foreign matter, the wear of the moving parts etc, make the building of a mechanism that achieves 0.15 mm lift for all the intake valves of a multicylinder engine unrealistic: even a tiny deviation of 0.02 mm from the 0.15 mm causes a strong cylinder-to-cylinder variation.

The tiny valve lift provides an idling of lower speed, of lower consumption and of higher quality. On the other hand, little can be done to secure that this tiny lift: is sustainable, is the same for all cylinders, is unchanged under thermal expansion and wear.

BACKGROUND ART

The following practical data make the problem clear.

A top power concentration 1600 cc, naturally aspirated, mass production engine with four cylinders, 16 valves, 33 mm intake valve diameter and 29 mm exhaust valve diameter, has been modified according the VVA described in the PCT/GR04/000043, which is the closest prior art. Details of the modification are presented in the www.pattakon.com web site. The resulting engine provides flat torque throughout the entire power band with peak power at 9000 rpm and 12 mm intake valve lift. The engine has no throttle valve and when the intake valve lift is decreased to 0.15 mm it idles at 300 rpm. The flow during idling, i.e. 300 rpm with ⅙ of the full charge, is 180 times lower than the flow at 9000 rpm and full load. Assuming that an intake valve lift deviation of 0.02 mm is practicable, the maximum from minimum difference of the valve area, i.e. of the surface or restriction through which the mixture is sucked into the cylinder, at 12 mm valve lift is $1-[(12+0.02)/(12-0.02)]$ or 0.33%, at 10 mm valve lift it becomes 0.4%, at 4 mm valve lift it becomes 1%, at 2 mm valve lift it becomes 2%, at 1 mm valve lift it becomes 4% and at 0.15 mm valve lift, i.e. at idling, the maximum from minimum difference of the valve area becomes 31%. This means that during idling the quantity of mixture sucked into a cylinder could differ more than 30% from the quantity of mixture sucked into its neighbor cylinder.

The periphery of each intake valve is $33*\pi=103.6$ mm, the periphery of the two intake valves is $2*103.6=207.2$ mm, the idling lift is 0.15 mm, the total valve area is $0.15*207.2=31$ mm$^2$, so the valve area of the two intake valves is equivalent to a hole of 6.29 mm diameter. The ratio 207.2/0.15, i.e. the total periphery of the two intake valves to the idling valve lift, equals to 1381. To control the area of a rectangle with sides 207.2 mm and 0.15 mm by changing only the tiny 0.15 mm side, is difficult and vulnerable: a deviation of 0.02 mm on the 0.15 mm side of the rectangle results in a 30% maximum to minimum difference of rectangle's area while the same deviation on the 6.29 mm diameter of the equivalent hole results in only 1% difference of maximum to minimum hole's area.

The problem is not of the specific VVA. It is general for all throttle-less VVAs: whilst at the one moment the intake valves must perform at high revs a highly stressed, long stroke motion for high power output, the next moment the same intake valves must perform a tiny stroke of extreme accuracy for idling.

In the patent applications US 20050172932, US 20050241598 and US 0050247278 some ways to bypass the problem are disclosed.

BRIEF SUMMARY OF THE INVENTION

The present patent solves the idling problem of the VVA engines, no matter what kind of VVA system they use, improving fuel economy, clean exhaust, apparent quality of operation etc.

The idea is to keep, during idling, the high flow capacity intake valves closed, and to use different path and means to control the air flow to the cylinder.

BRIEF DESCRIPTION OF THE DRAWINGS

FIG. 2a shows what FIG. 1a from a different viewpoint.

FIGS. 2b, 2c, 2d, 2e and 2f show the intake port with the secondary valve from various viewpoints, and in section view.

DETAILED DESCRIPTION OF THE INVENTION

Figure 1A:
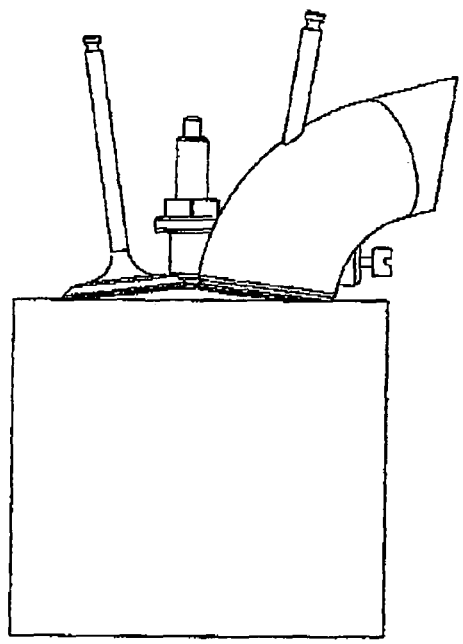
FIG. 1a shows the cylinder, the valves and the intake port of an embodiment.
Figure 1B:
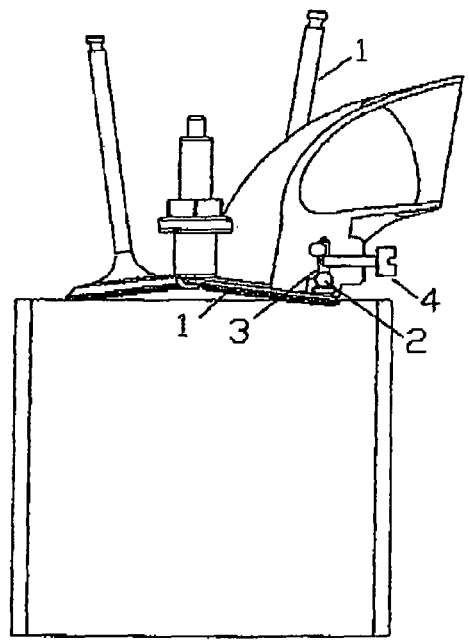
FIG. 1b shows what FIG. 1a, with the cylinder and the intake port sliced.
Figure 1C:
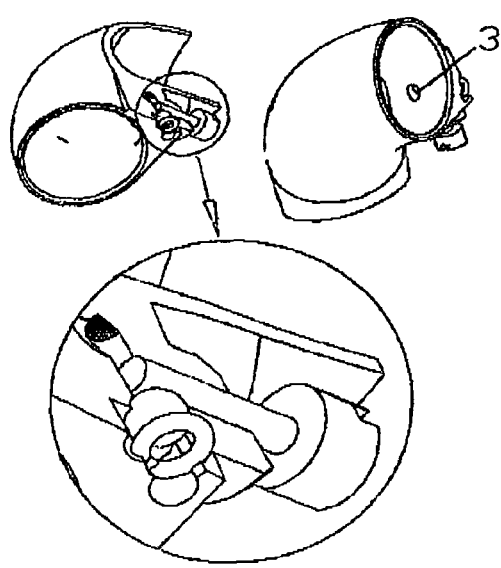
FIGS. 1c and 1d show details of the intake port and of the idle valve of FIG. 1a, from different viewpoints.
Figure 1D:
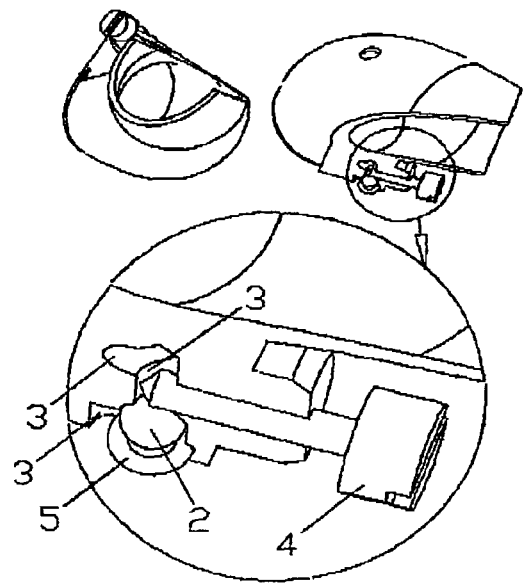

FIGS. 1a to 1d and 2a to 2f show one embodiment where a "bypass feeding path" interconnects the combustion chamber to the intake port, comprising a spherical "one way" valve 2, or secondary intake valve 2, an orifice 3 and an adjusting screw 4. The secondary intake valve 2 has many times lower flow capacity than the normal or primary intake valves 1 of the cylinder. During idling the primary intake valves 1 stay permanently closed, the vacuum inside the cylinder, at suction, opens the "one way" valve 2 and air or mixture flows from the intake port into the cylinder through the orifice 3. The backwards flow of the mixture to the intake port is blocked by the "one way" valve 2.

Figure 3A:
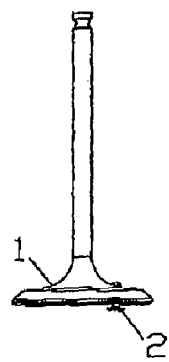
FIG. 3a shows another embodiment wherein the primary valve bears a secondary poppet valve on it.
Figure 3B:
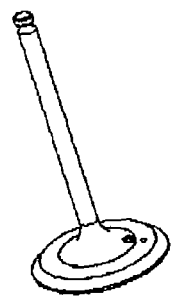
FIGS. 3b to 3c show what FIG. 3a from different viewpoints.
Figure 3C:
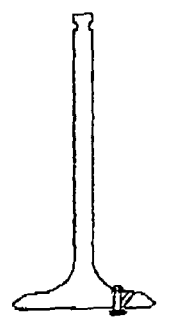
Figure 3D:
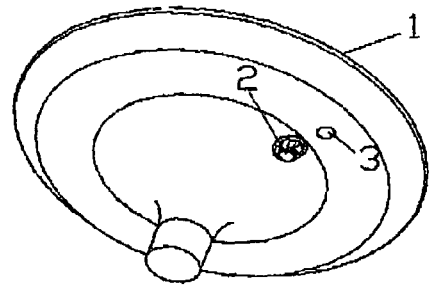
FIGS. 3d to 3g show, from various viewpoints, the head of the primary valve of FIG. 3a with the secondary valve on it.
Figure 3E:
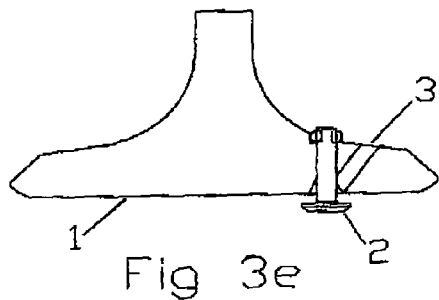
Figure 3F:
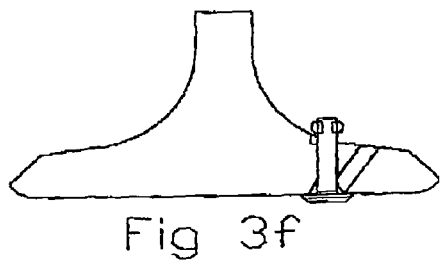
Figure 3G:
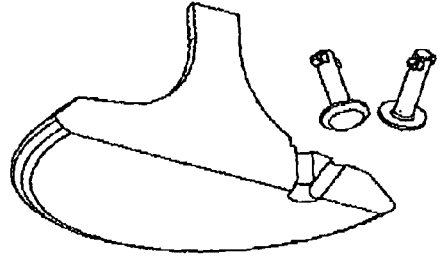
Figure 4A:
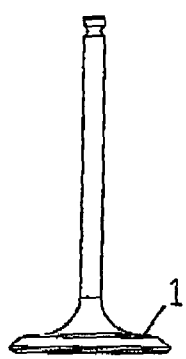
FIG. 4a shows another embodiment wherein the primary valve bears a secondary one-way spherical valve.
Figure 4B:
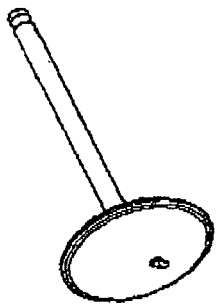
FIGS. 4b to 4c show what FIG. 4a from different viewpoints.
Figure 4C:
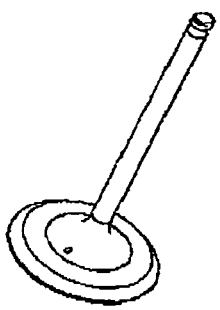
Figure 4D:
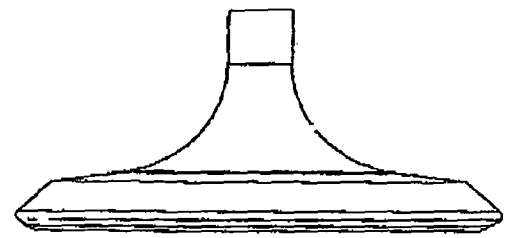
FIGS. 4d to 4g show, from various viewpoints, the head of the primary valve of FIG. 4a with the spherical one-way valve on it.
Figure 4E:
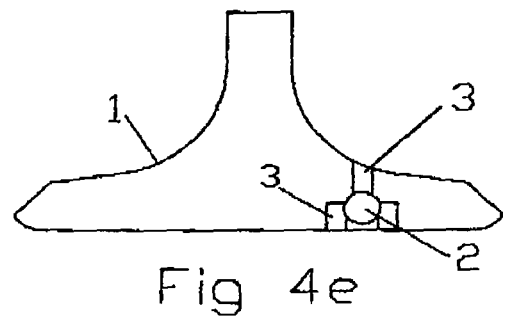
Figure 4F:
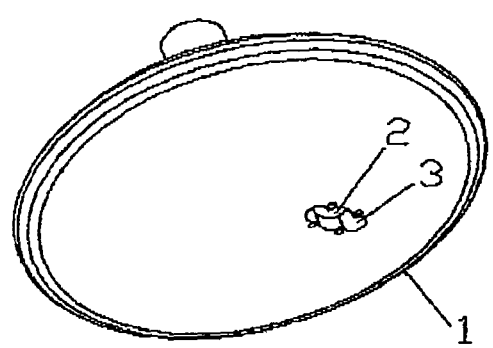
Figure 4G:
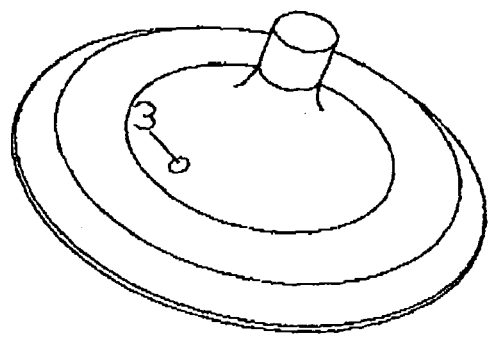

In another embodiment the modification concerns only the intake valves. A secondary intake valve 2 like the small poppet valve of FIGS. 3a to 3g, or like the small sphere of FIGS. 4a to 4g, is located on or in the primary intake valve 1. The vacuum inside the cylinder opens the "one way" or secondary intake valve 2 inside the head of the primary intake valve 1, and air or mixture is sucked from the intake port into the cylinder though the orifice 3, even with the primary intake valve 1 closed. In practice a diameter of 1 mm for the orifice 3 and a diameter of 1.5 mm, i.e. a mass of 0.014 grams if made of steel, for the spherical secondary intake valve 2 of FIGS. 4a to 4g are adequate for the idling of a four valve, 400 cc cylinder. The orifice 3 resembles to the idling orifice that bypasses the throttle valve of carburetors.

Figure 5A:
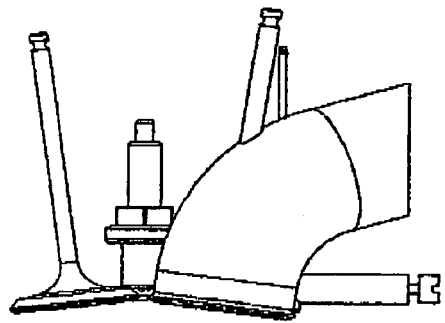
FIG. 5a shows another embodiment wherein the secondary valve is a small conventional poppet valve.
Figure 5D:
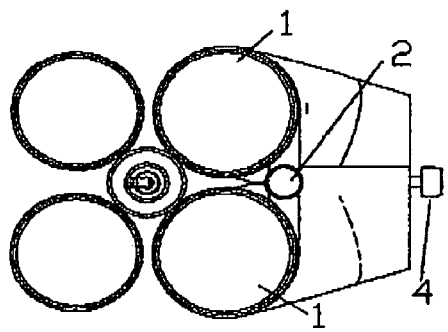
FIGS. 5b to 5e show what FIG. 5a from various viewpoints.
Figure 5B:
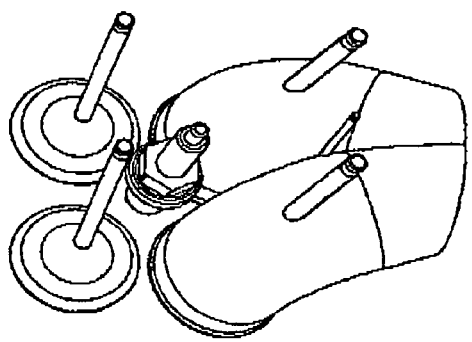
Figure 5E:
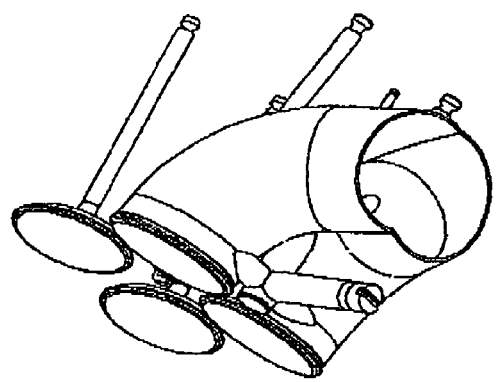
Figure 5C:
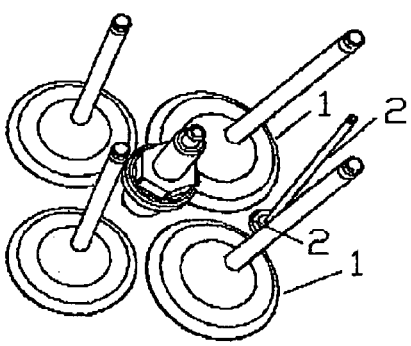
Figure 5F:
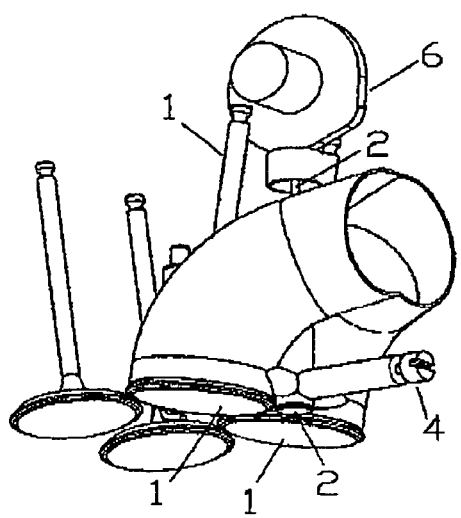
FIG. 5f shows what FIG. 5a from a different viewpoint; it also shows a cam actuating the secondary valve.

In another embodiment, FIGS. 5a to 5f, the secondary intake valve 2 is a small diameter poppet valve actuated by a cam 6 of a camshaft to perform a short lift motion. With the high capacity primary intake valves 1 closed, the small flow capacity of the secondary intake valve 2 allows precise control of the quantity of charge entering the cylinder. Using adjusting screws 4, the fine-tuning of multicylinder engines becomes easy.

Figure 6A:
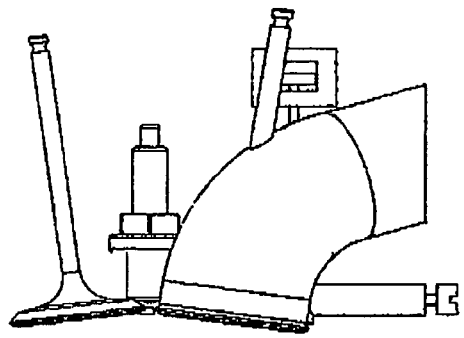
FIG. 6a shows another embodiment wherein the secondary valve is a small conventional poppet valve actuated by an electromagnet.
Figure 6D:
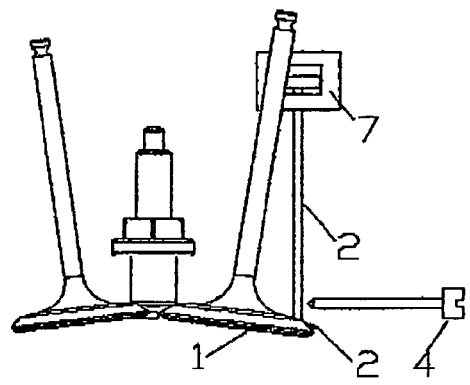
FIGS. 6d to 6f show what FIG. 6a after the removal of the intake port, from various viewpoints.
Figure 6B:
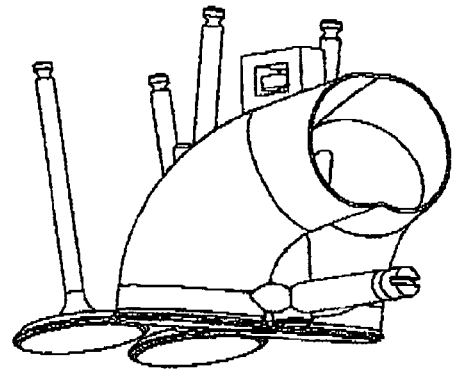
FIGS. 6b to 6c show what FIG. 6a from various viewpoints.
Figure 6E:
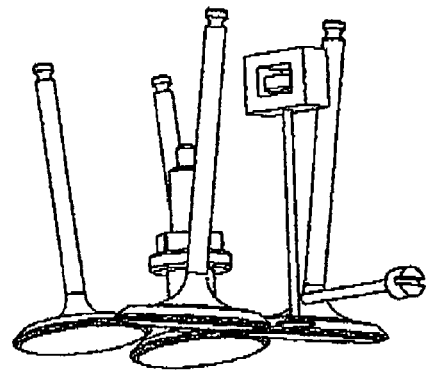
Figure 6C:
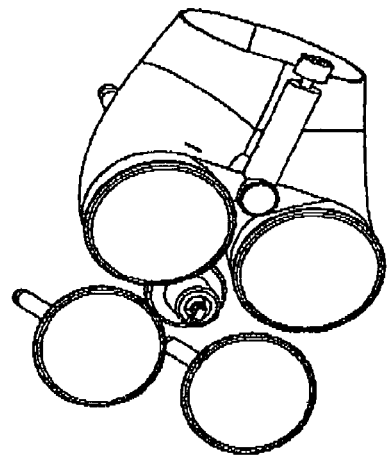
Figure 6F:
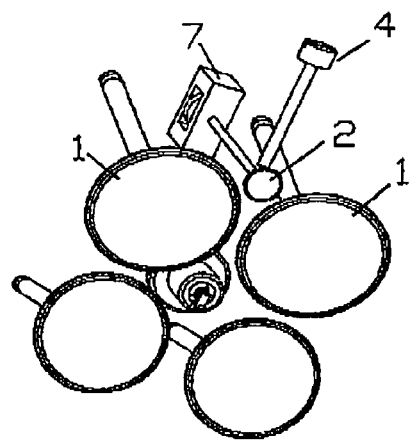

In another embodiment, FIGS. 6a to 6f, the secondary intake valve is a small diameter poppet valve 2 actuated by an electromagnet 7: the small inertia, the short stroke it performs and the slow operational revs fit to this kind of actuation. By increasing the duration of the electrical pulses that keep the secondary valve open, namely a control similar to the control used for the injection duration, the idling operation can be further controlled. This type of control fits not only to idling: as long as the engine operates below the secondary intake valve flow capacity, the primary intake valves can stay closed while the secondary intake valve controls precisely the flow of air to the cylinder according drivers demand.

In all previous embodiments the simplicity of the motion of the secondary intake valve, its small inertia, the short stroke it performs, the small periphery to stroke ratio and the light loads it carries, make it ideal for precise, stable and long lasting idling control.

Although the invention has been described and illustrated in detail, the spirit and scope of the present invention are to be limited only by the terms of the appended claims.

The invention claimed is:

1. A throttle-less engine comprising a primary intake valve and a smaller secondary intake valve in a cylinder head:
   control means for operating a continuously variable lift profile of said primary valve;
   control means for keeping said primary valve closed at idle;
   said secondary valve having a cross-sectional area less than 20% of said primary valve.

2. A throttle-less engine according claim 1 wherein the secondary valve is a one-way valve that provides air or mixture to the cylinder at suction and blocks the flow at the opposite direction.

3. A throttle-less engine according claim 1 wherein the primary valve bears the secondary valve.

4. A throttle-less engine according claim 1 wherein the secondary valve is actuated by an electromagnet.

5. A throttle-less engine according claim 1 comprising control means for operating a continuously variable lift profile of said secondary valve, so that the secondary valve controls the load of the engine for as long as the primary valve is kept closed.

6. A throttle-less engine according claim 1 wherein the cross-sectional area of the secondary valve is less than 10% of the primary valve.

7. A throttle-less engine according claim 1 wherein the cross-sectional area of the secondary valve is less than 5% of the primary valve.

* * * * *